United States Patent [19]
Bundy

[11] Patent Number: 5,897,125
[45] Date of Patent: Apr. 27, 1999

[54] SWIVEL TRUCK STEP

[75] Inventor: Don Bundy, Sapulpa, Okla.

[73] Assignee: Mid America Automotive Products, Inc., Sapulpa, Okla.

[21] Appl. No.: 08/903,915

[22] Filed: Jul. 31, 1997

[51] Int. Cl.[6] .................................................. B60R 3/00
[52] U.S. Cl. ........................................... 280/166; 280/169
[58] Field of Search ................................... 280/163, 166, 280/169; 182/89, 90, 91, 92, 93

[56] References Cited

U.S. PATENT DOCUMENTS

| | | | |
|---|---|---|---|
| 3,329,443 | 7/1967 | Lowder et al. | 280/166 |
| 3,912,299 | 10/1975 | Carr | 280/166 |
| 3,980,319 | 9/1976 | Kirkpatrick | 280/166 |
| 3,981,515 | 9/1976 | Rosborough | 280/166 |
| 5,501,475 | 3/1996 | Bundy | 280/166 |

*Primary Examiner*—Richard M. Camby
*Attorney, Agent, or Firm*—Molly D. McKay, P.C.

[57] ABSTRACT

A truck step securable to a vehicle via a mounting bracket an having a step arm capable of swiveling between a "storage" position underneath the vehicle and an "in use" position where the step arm extends outward from under the vehicle. A distal end of the step arm is provided with a step plate where a user's foot may be placed when stepping into the vehicle, and a proximal end of the step arm is provided with a lower swivel plate which swivels relative to an upper swivel plate provided on the mounting bracket. The lower and upper swivel plates have mating valleys and ridges to lock the step in one of several positions.

6 Claims, 2 Drawing Sheets

SWIVEL TRUCK STEP

BACKGROUND OF THE INVENTION

1. Field of the Invention

The present invention relates to a step securable to a vehicle, such as a truck. The step can be swung outward from underneath the vehicle via a swivel mechanism provided on the step. In this position, the step may be used in order to allow a person to step into the vehicle. The step can be swung, via the swivel mechanism, back underneath the vehicle when it is not in use.

2. Description of the Related Art

Various types of steps can be added onto a pickup truck to allow a person to step thereon in order to facilitate the person's entry and exit from the pickup. One such step is a universal stainless steel truck step invented by Applicant, for which U.S. Pat. No. 5,501,475 was granted on Mar. 26, 1996.

The drawback with each of these add-on types of vehicle steps is that they rigidly attach to the vehicle and extend outward from under the vehicle where they can be in the way when they are not being used. The present invention addresses this problem by providing a swivel truck step which can be swung outward from under the vehicle in order to allow the step to be used and can be swung back inward under the vehicle when not in use. The present swivel step further is easily swung outward and inward by engagement with the shoe or foot of the user, enabling the user to move the step without stooping over. Further, the swivel step locks in place in its outwardly swung position whenever a user's weight is exerted on the top of the step, as when the user steps upon it. When thus locked in place, the step will not swing until the user's weight has been removed from the step.

SUMMARY OF THE INVENTION

The present invention is a swivel truck step having a step arm capable of swiveling outward from under a vehicle to an "in use" position and swivelling back under the vehicle to a "storage" position. The step mounts to the vehicle via a mounting bracket. The mounting bracket is provided with an upright extension having a mounting opening therethrough. A bolt, such as a spring hanger bolt, can be inserted through the mounting opening in order to secure the bracket to the vehicle, for example by securing the bracket to the vehicle via the spring hanger which is provided underneath the vehicle to secure the vehicle springs to the vehicle.

The mounting bracket is also provided with a horizontal extension located at a lower end of the upright extension. The horizontal extension is approximately perpendicular to the upright extension. An upper swivel plate is secured to a lower surface of the horizontal extension. A lower surface of the upper swivel plate is provided with a pair of downwardly extending ridges. These ridges are perpendicular to each other and intersect each other at a central opening. The central opening extends through both the upper swivel plate and the horizontal extension. Each ridge is provided with sloped ridge sides.

A distal end of the step arm is provided with a horizontal step plate. The step plate is provided with a downwardly extending lip, and the step plate may optionally have a step plate cover secured on its upper surface for increased traction.

A proximal end of the step arm is secured to a horizontal lower swivel plate. Two downwardly extending valleys are provided in an upper surface of the lower swivel plate. The valleys are perpendicular to each other and intersect at a center opening provided in the lower swivel plate. The lower swivel plate is provided with flat plateau areas on either side of each of the valleys. Each valley is provided with sloped valley sides which extend upward from the valley to the adjacent plateau areas.

The upper and lower swivel plates are held together in rotatable engagement by a bolt which consecutively passing upward through the following: a washer, the center opening in the lower swivel plate, the central opening in the upper swivel plate, and in the horizontal extension a spacer bushing with a heavy duty die spring movably disposed around the spacer bushing, and a lock nut which engages a thread end of the bolt.

DETAILED DESCRIPTION OF THE PREFERRED EMBODIMENT

Figures 1, 2:
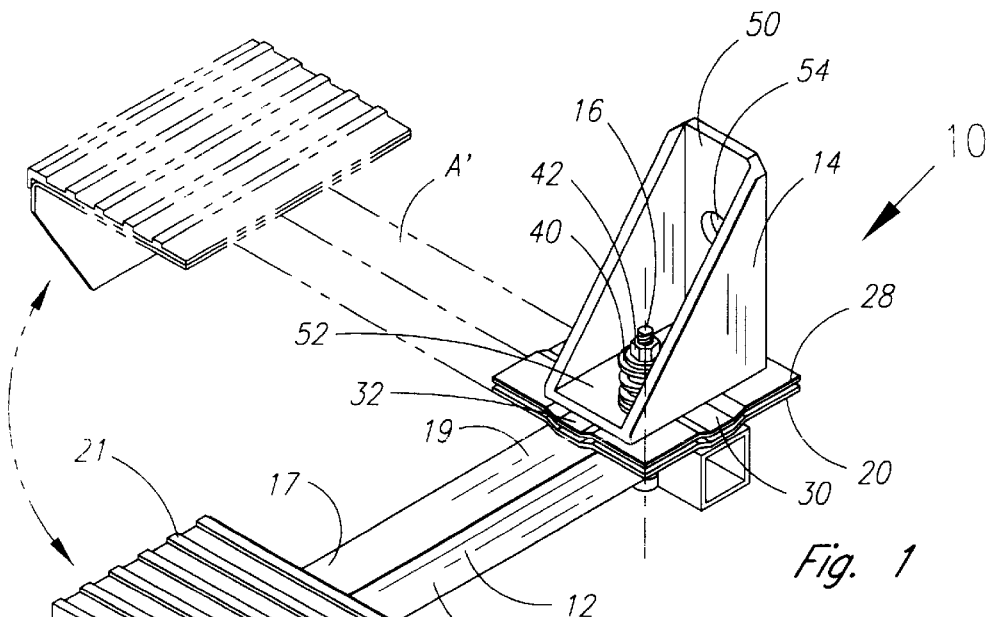
FIG. 1 is a perspective view of a preferred embodiment of the present invention for a swivel truck step, illustrating an "in use" position and a "storage" position for the step.
FIG. 2 is an exploded view of the step of FIG. 1.

Referring now to FIGS. 1 and 2, there is illustrated a swivel truck step 10 constructed in accordance with a preferred embodiment of the present invention. As illustrated in FIG. 1, the step 10 is provided with a step arm 12 which can be swivelled or swung horizontally between an "in use" position A to a "storage" position A'. Although, not illustrated, the step arm 12 may also be swivelled to an "alternate storage" position which is located 180° from "storage" position A' and 90° from the "in use" position A.

Referring now to FIG. 2, the construction of the step 10 is illustrated. The step 10 is comprised of the step arm 12 and a mounting bracket 14 which are rotatably secured together by means of a bolt 16. A distal end of 17 of the step arm 12 is provided with a horizontal step plate 18. An opposite proximal end 19 of the step arm 12 is provided with a horizontal, upwardly facing, lower swivel plate 20.

A step plate cover 21 may optionally be secured to an upper surface of the horizontal step plate 18 to provide additional traction for a user's foot when the user steps upon the horizontal step plate 18. The step plate cover 21 is preferably constructed of rubber, plastic or other suitable non-skid material. The horizontal step plate 18 is provided with a downwardly extending lip 23 which can be engaged by a user's foot in order to swing or swivel the step arm 12 between its "in use" position A, its "storage" position A', or its "alternate storage" position (not shown).

As illustrated in FIG. 2, the lower swivel plate 20 is provided with two perpendicular indentations or valleys 22 and 24 which intersect at a center opening 26 provided extending through the lower swivel plate 20.

The mounting bracket 14 is provided with a horizontal, downwardly facing, upper swivel plate 28 which is secured to a horizontal extension 52 of the mounting bracket 14. The upper swivel plate 28 is provided with two perpendicular extensions or ridges 30 and 32 which intersect at a central opening 34 which extends through the upper swivel plate 28 and through the horizontal extension 52 of the mounting bracket 14.

The bolt 16 is preferably an Allen head shoulder bolt. The bolt extends upward through respectively, a washer 36, the center opening 26 in the lower swivel plate 20, the central opening 34 in the upper swivel plate 28 and in the horizontal extension 52 of the mounting bracket 14, a spacer bushing 38 and a heavy duty spring 40 which is movably disposed around the bushing 38 and finally a locking nut 42. The locking nut 42 secures to a threaded end of the bolt to secure the bolt to the step 10. The spring 40 is captured between the locking nut 42 and the horizontal extension 52 of the mounting bracket 14, thus exerting an upward pulling force on the bolt 16 and on the lower swivel plate 20, as will be discussed hereafter.

As shown in FIGS. 1 and 2, the ridges 30 and 32 mate with the valleys 22 and 24 when the step arm 12 is in the "in use" position A. In order for the step arm to swivel to the "storage" position A' or to the "alternate storage" position (not illustrated), the lower swivel plate 20 must move slightly downward away from the upper swivel plate 28. This downward movement is facilitated by compression of the spring 40 which occurs when the step arm 12 is swivelled on the bolt 16. As the step arm 12 is swivelled, sloped valley sides 44 provided on each of the valleys 22 and 24 engage sloped ridge sides 46 provided on each of the ridges 30 and 32, causing the sloped valley sides 44 to move downward on the sloped ridge sides 46 until plateau areas 48 provided on the lower swivel plate 20 on either side of the valleys 22 and 24 slide down to engage the ridges 30 and 32. The plateau areas 48 continue to swivel horizontally under the downwardly extending ridges 30 and 32 until the ridges 30 and 32 once again encounter the valleys 24 and 22. At this time the lower swivel plate 20 will again move slightly upward relative to the upper swivel plate 28 as the valleys 24 and 22 engage respectively the ridges 30 and 32, thus placing the step arm 12 into the "storage" position A' or the "alternate storage" position (not shown) depending on whether the step arm 12 was moved left or right relative to the upper swivel plate 28 when the step arm 12 was swivelled. To reposition the step arm 12 to the "in use" position A, this procedure is reversed.

The step arm 12 is placed in either its "in use" or "storage" positions whenever the ridges 30 and 32 are in mating relationship with the valleys, either 22 and 24 or 24 and 22. As previously described, it is necessary for the entire lower swivel plate 20 to move slightly downward relative to the upper swivel plate 28 in order for the valleys 22 and 24 and ridges 30 and 32 to disengage each other sufficiently to allow the step arm 12 to swivel. Whenever the step arm 12 is in the "in use" position A and a user steps upon the step plate 18, a side of the lower swivel plate 20 adjacent to the step arm 12 will move downward relative to the upper swivel plate 28 and an opposite side of the lower swivel plate 20 will move upward relative to the upper swivel plate 28. Thus the valley, either 22 or 24, provided on the opposite side of the lower swivel plate 20 will be forced upward into tight locking engagement with the ridge 32, thereby preventing the step arm 12 from swivelling until the user's weight is removed from the step plate 18.

As illustrated in FIGS. 1 and 2, the mounting bracket 14 also has an upright extension 50 extending upward approximately perpendicular to the horizontal extension 52. The upright extension 50 is provided with at least one mounting opening 54 for securing the step 10 to a vehicle 55, as illustrated in FIGS. 3 to 5.

Figure 3:
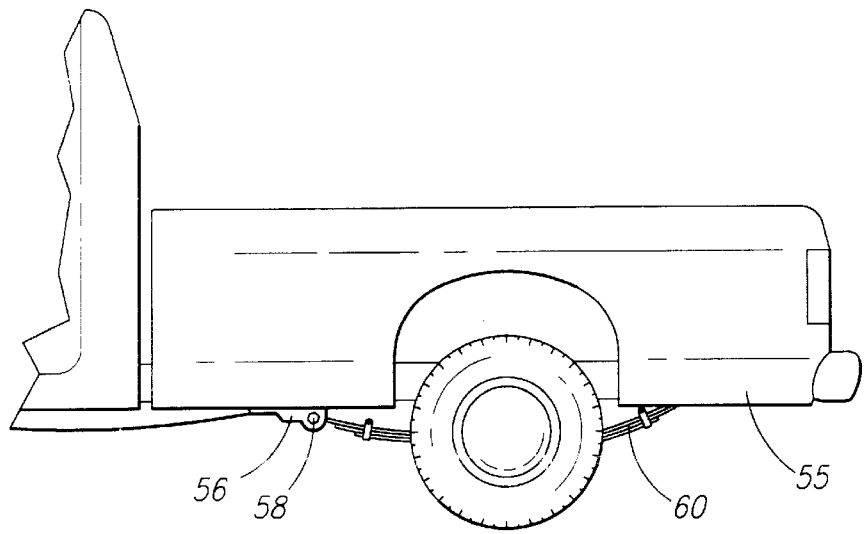
FIG. 3 is a left side view of a vehicle.

Referring now to FIG. 3, a vehicle 55, such as the pickup truck illustrated, is normally provided with a spring hanger 56 which extends downward underneath the vehicle 56. A spring hanger bolt 58 passes through an opening in the spring hanger 56 in order to secure the vehicle's springs 60 to the vehicle 55.

Figure 4:
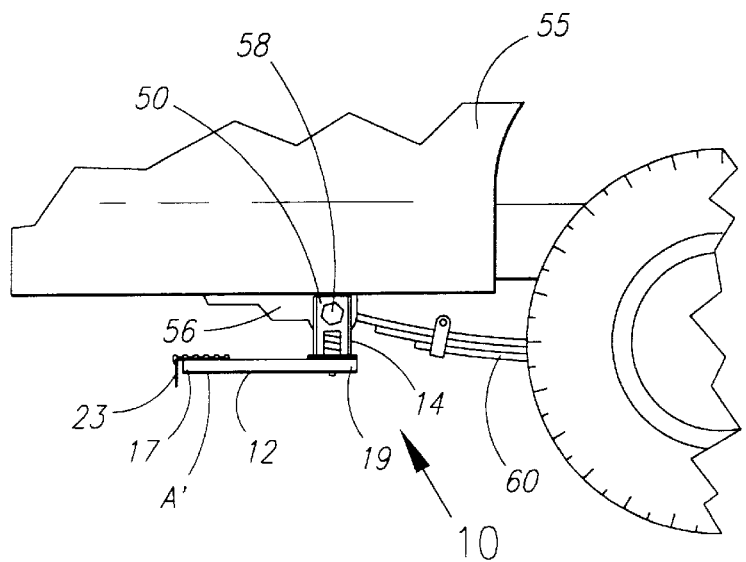
FIG. 4 is an enlarged view of the vehicle of FIG. 3 with a step of FIG. 1 secured thereto and shown with the step swing sideward so that it is positioned underneath the vehicle in the "storage" position.
Figure 5:
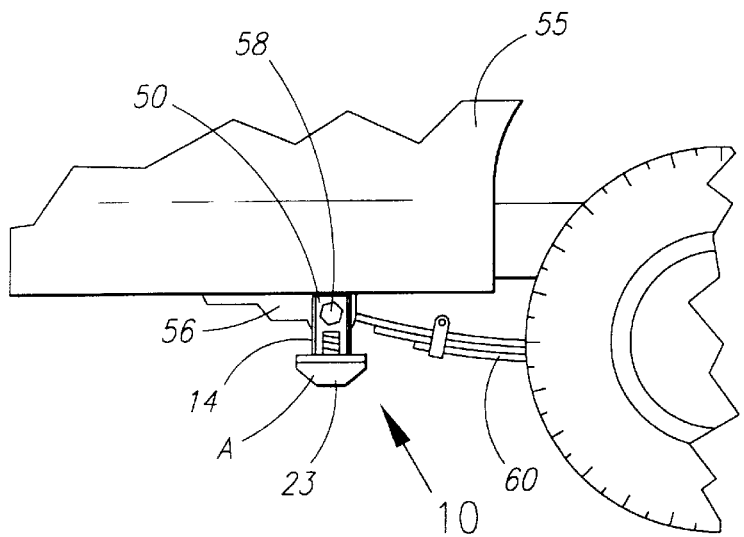
FIG. 5 is the step of FIG. 4 shown swing outward so that it extends outward from underneath of the vehicle in the "in use" position.

The step 10 may be secured to the vehicle 55 by passing the spring hanger bolt 58 through the mounting opening 54 in the upright extension 50 on the mounting bracket 14 before inserting the spring hanger bolt 58 through the spring hanger 56 of the vehicle 55, as shown in FIGS. 4 and 5. Although not illustrated, the step 10 may alternately be secured to a vehicle 55 via the an opening provided in a frame of the vehicle 55. Also, the step is not limited to use with a pickup truck as the vehicle 55, but may be used on any type of vehicle where a swivel step would be desirable.

FIG. 4 illustrates the position of the step arm 12 when the step 10 is in the "storage" position A', and FIG. 5 illustrates the step 10 in its "in use" position A. As previously described, the user can move the step 10 between these positions A and A' by engaging the lip 23 with their foot, thus allowing them to move the step 10 without stooping down.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A swivel truck step for attachment to a vehicle comprising a mounting bracket for securing a swivel step to a vehicle, a proximal end of a step arm rotatably secured to said mounting bracket, a horizontal step plate provided on an opposite distal end of said step arm, a lower swivel plate provided on said proximal end of said step arm, an upper swivel plate provided on said mounting bracket, and tension means for rotatably securing said lower swivel plate underneath said upper swivel plate.

2. A swivel truck step comprising a mounting bracket for securing a swivel step to a vehicle, a proximal end of a step arm rotatably secured to said mounting bracket, a horizontal step plate provided on an opposite distal end of said step arm, a lower swivel plate provided on said proximal end of said step arm, an upper swivel plate provided on said mounting bracket, tension means for rotatably securing said lower and upper swivel plates together, valleys provided extending downward in an upper surface of said lower swivel plate, said valleys intersecting at a center opening provided in the lower swivel plate, and ridges provided extending downward from a lower surface of said upper swivel plate, said ridges intersecting at a central opening provided in the upper swivel plate.

3. A swivel truck step according to claim 2 wherein said tension means for rotatably securing said lower and upper swivel plates together further comprises a bolt, said bolt extending consecutively through said center opening in said lower swivel plate, said central opening in said upper swivel plate, a spacer bushing with a spring disposed therearound, and a locking nut.

4. A swivel truck step according to claim 3 further comprising sloping valley sides being provided on each said valley and sloping ridge sides being provided on each said ridge.

5. A swivel truck step according to claim 4 further comprising said mounting bracket being provided with an upright extension extending upward approximately perpendicular to a horizontal extension of the mounting bracket, and said upright extension being provided with a mounting opening for securing the mounting bracket to a vehicle.

6. A swivel truck step according to claim 2 further comprising a step plate cover provided secured to an upper surface of said horizontal step plate.

* * * * *